(No Model.)
C. W. RAYMOND.
Tempering-Wheel for Clay and Mortar.
No. 227,835. Patented May 18, 1880.
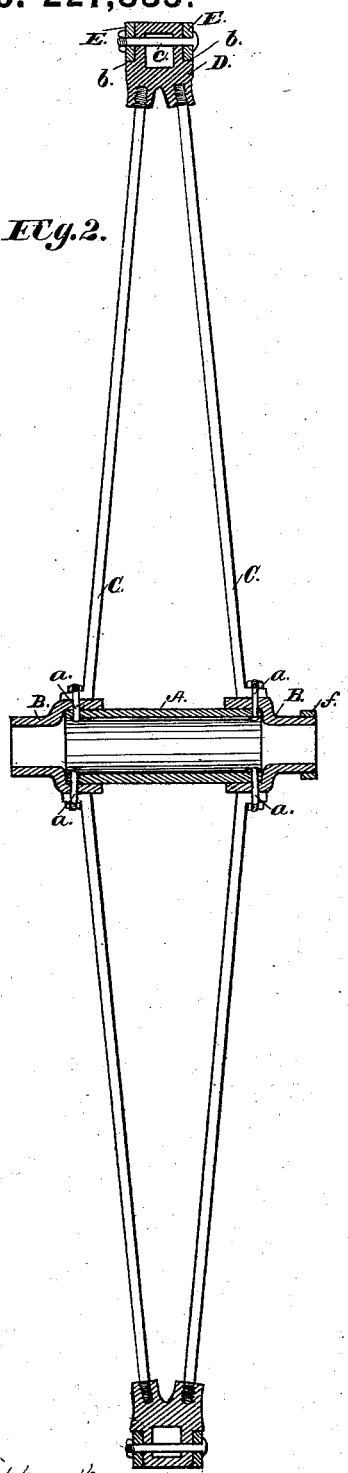
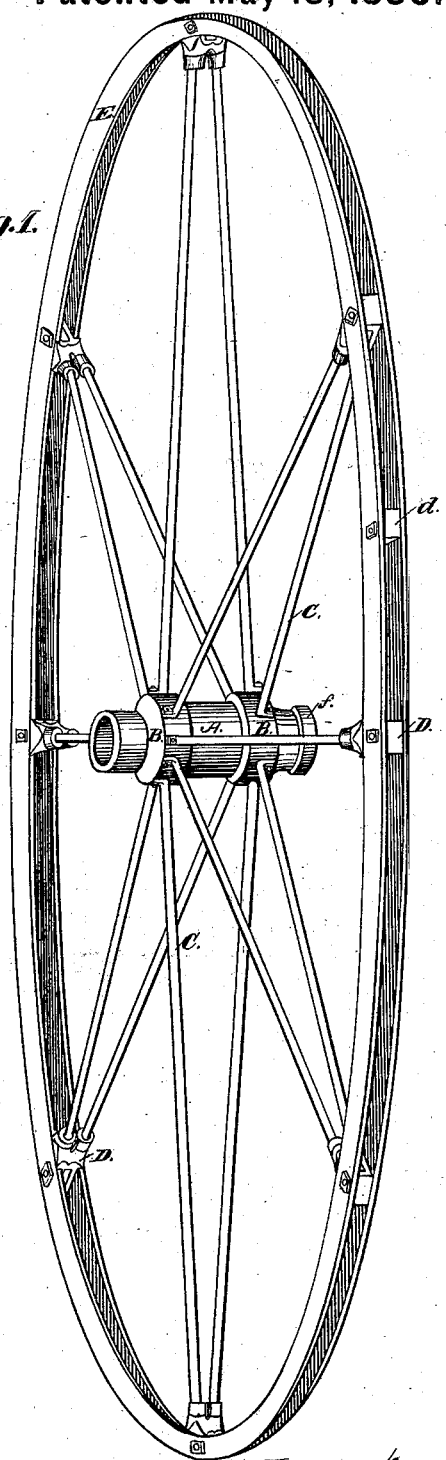

UNITED STATES PATENT OFFICE.

CHARLES W. RAYMOND, OF DAYTON, OHIO.

TEMPERING-WHEEL FOR CLAY AND MORTAR.

SPECIFICATION forming part of Letters Patent No. 227,835, dated May 18, 1880.

Application filed March 20, 1880. (No model.)

*To all whom it may concern:*

Be it known that I, CHARLES W. RAYMOND, of Dayton, in the county of Montgomery and State of Ohio, have invented certain new and useful Improvements in Tempering-Wheels; and I do hereby declare the following to be a full, clear, and exact description of the same.

My invention relates to an improvement in tempering-wheels for tempering clay and mortar in brick-making.

The object of my invention is to construct a wheel entirely of metal, preferably wrought-iron, which shall combine lightness with great strength and rigidity.

The novelty consists in the construction and combination of the parts, as will be herewith set forth and specifically claimed.

In the accompanying drawings, Figure 1 is a perspective view of my improved tempering-wheel. Fig. 2 is a central sectional view through the axis of the wheel.

The hub of the wheel is composed of a central wrought-metal sleeve, A, carrying at each end axle-bearing collars or boxes B. These collars, as shown, have bores of varying diameters, the inner one of sufficient size to slip snugly over the ends of the sleeves A, and the outer one of smaller diameter to encompass the axle or spindle upon which the wheel travels.

The spokes C are in pairs and secured to the hub by bolts which lock the sleeve A and collars B together, as shown. These spokes are wrought metal and may be either hollow or solid. Their bent and perforated lower ends rest upon the overlapped portions of the collars B, and are clamped in place by bolts $a$, which serve also to lock the sleeve A and collars B together, as indicated. From this point they extend radially, and each pair converges and has its upper ends, which are threaded, screwed into a forked metal bracket, D, of the shape represented. As seen, this bracket carries a recessed bearing portion with shoulders $b$.

The tempering-rings E are two flat annular disks, which rest against each side of bearing portions of the bracket and upon the shoulders $b$, as seen. They are held firmly in this position by bolts $c$, which, passing through the recessed portion of the brackets, lock them securely thereto. Where the spokes are comparatively few in number, strengthening-blocks $d$ may be bolted between the tempering-rings half-way between the spokes, as seen in Fig. 1.

The above construction is such that a very rigid and light tempering-wheel is produced, which will stand the strain and wear to which this class of wheels is subjected.

By making the hub in sections, should any part break it can be readily replaced without requiring an entire new hub. So with the other parts, which are interchangeable and readily taken apart.

A very essential feature of my invention is in setting the tempering-rings into and against solid-metal bearings, which will not give and wear, as is the case where wood is employed. To further strengthen the hub and prevent its wear I secure a ring, $f$, upon its end upon which the sliding strain comes, thus forming a thicker and more solid bearing to resist such strain and wear.

I do not wish to be limited to the precise construction herein shown; but

I claim—

1. In a tempering-wheel made of metal and having convergent pairs of spokes, the hub consisting of a central sleeve, which does not bear upon the spindle and overlapping projecting collar-boxes, substantially as and for the purpose specified.

2. In a tempering-wheel having a metal hub, the spokes set in convergent pairs and connected at their outer ends by the ring-bearing brackets, as and for the purpose described.

3. In a tempering-wheel, the tempering-rings secured to metal bearings or brackets, as and for the purpose specified.

4. In a tempering-wheel, the spokes and ring-uniting brackets consisting of an upper shouldered ring-bearing portion and under spoke-uniting sockets, as and for the purpose described.

In testimony whereof I have hereunto set my hand.

CHARLES W. RAYMOND.

Witnesses:
  WM. C. THOMPSON,
  CHAS. M. PECK.